United States Patent [19]
Sato et al.

[11] Patent Number: 5,648,769
[45] Date of Patent: Jul. 15, 1997

[54] VEHICLE DATA PROCESSING SYSTEM WHICH CAN COMMUNICATE WITH INFORMATION CENTER

[75] Inventors: Koji Sato; Makoto Morita, both of Mishima; Masafumi Kizu, Toyota, all of Japan

[73] Assignee: Toyota Jidosha Kabushiki Kaisha, Toyota, Japan

[21] Appl. No.: 443,801

[22] Filed: May 18, 1995

[30]    Foreign Application Priority Data

Oct. 6, 1994 [JP] Japan .................................. 6-242591

[51] Int. Cl.⁶ .................................................. G08G 1/123
[52] U.S. Cl. ................................... 340/988; 364/443
[58] Field of Search .................... 340/988, 825.51, 340/825.44, 989, 994, 995, 993, 905; 379/57; 364/424.01, 424.02, 424.03, 424.04

[56]    References Cited

U.S. PATENT DOCUMENTS

| 4,251,865 | 2/1981 | Moore et al. ................... 364/222.2 |
| 4,797,948 | 1/1989 | Milliorn et al. ................ 340/991 |
| 5,172,321 | 12/1992 | Ghaen et al. ................... 340/995 |
| 5,182,555 | 1/1993 | Sumner ........................... 340/995 |
| 5,420,794 | 5/1995 | James ............................. 340/993 |
| 5,444,444 | 8/1995 | Ross ............................... 340/994 |
| 5,544,061 | 8/1996 | Morimoto et al. .............. 340/995 |

FOREIGN PATENT DOCUMENTS

| 3-279999 | 12/1991 | Japan . |
| 5-53503 | 3/1993 | Japan . |
| 5-265376 | 10/1993 | Japan . |

*Primary Examiner*—Jeffery Hofsass
*Assistant Examiner*—Mohammed R. Ghannam
*Attorney, Agent, or Firm*—Kenyon & Kenyon

[57]    ABSTRACT

A vehicle data processing system is provided which, even if an on-vehicle data processor such as a navigation system or the like is not active, can input the necessary data into the system at an operator's home or the like. A vehicle includes a data processor and an input unit is independently located in the operator's home or other place. Data of destination and the like inputted into the input unit are transmitted to an information center wherein they are stored in a storage unit. When a sensor in the information center senses that the data processor on the vehicle has become active, the input data are transmitted from the input unit to the data processor.

6 Claims, 5 Drawing Sheets

3,648,769

VEHICLE DATA PROCESSING SYSTEM WHICH CAN COMMUNICATE WITH INFORMATION CENTER

BACKGROUND OF THE INVENTION

1. Field of the Invention

The present invention relates to a vehicle data processing system and particularly to such a system that comprises a data input unit and a separate on-vehicle processing unit.

2. Description of the Prior Art

Various types of information processing systems such as navigation systems, audio systems and the like have been mounted on vehicles. In the navigation systems, however, a driver must input transit points and a destination with reference to a display unit in the processor, but cannot input these data at his or her home without getting in the vehicle.

To overcome such an inconvenience, a navigation system has been proposed which comprises portable input means for manually inputting transit points and a destination, storage means for storing the positional data of the inputted transit points and destination and a communication line for transmitting the positional data of the transit points and destination read out from the storage means to the main on-vehicle navigation unit of the navigation system, the input and storage means being operable independently of the main on-vehicle navigation unit of the navigation system, as shown in Japanese Patent Laid-Open No. Hei 5-265376. In such an arrangement, an operator can input transit points and a destination into the portable input means at his or her home. After the operator has gotten in the vehicle, he or she can connect the communication line of the navigation system to the main on-vehicle navigation unit thereof to transmit the stored data to the main on-vehicle navigation unit of the navigation system.

However, it is troublesome that after the data have been inputted into the input means at the operator's home, he or she must carry input means to the main on-vehicle navigation unit to the vehicle and connect it in order to transmit the stored data to the main on-vehicle navigation unit. It is of course possible that the data may be transmitted from the input means as placed in the operator's home to the main on-vehicle navigation unit through radio waves. At such a time, the main on-vehicle navigation unit must be active or in a data receiving state. Usually, the main on-vehicle navigation unit is energized when the vehicle engine is started. Thus, the problem of troublesome operation is still not overcome.

SUMMARY OF THE INVENTION

It is therefore an object of the present invention to provide a vehicle data processing system which can input data from an input means to an on-vehicle data processor such as the main on-vehicle navigation unit mentioned above with an improved operability even if the on-vehicle data processor is inactive.

To this end, the present invention provides a vehicle data processing system comprising an on-vehicle data processor having a data receiving portion for receiving data to be processed, an off-vehicle input unit separated and independent from the data processor, a data storage unit for storing data inputted into the data input unit, a sensor unit for sensing the start of the data processor, and a data transmitter for transmitting the data stored in the data storage unit to the data processor when the start of the data processor is sensed by the sensor unit. Even if the data processor is inactive, the operator can thus input data through the data input unit at his or her home. When the data processor is energized by the operator, the data will be automatically transmitted from the data transmitter to the data processor. Therefore, problems of carrying the data input unit or initializing the data processor only for data input can be avoided.

The data storage unit, sensor and data transmitter may be disposed within an information center which is arranged in the vehicle. The data processor may include a transmitter portion for transmitting a start signal to the information center when the data processor is started. The data transmission between the information center and the data processor is made through a mobile telephone system. The data processor may be replaced by a navigation system or an audio system.

The present invention also provides a vehicle data processing system comprising an on-vehicle data processor having a data transmitting portion for transmitting a request signal and a data receiving portion for receiving data to be processed, an off-vehicle input unit separated and independent from the data processor, a data storage unit for storing data inputted into the data input unit, a sensor means for sensing a vehicle receiving the request signal and a data transmitter responsive to the request signal for accessing the data storage unit to read the corresponding data and for transmitting the read data to the data processor in the vehicle sensed by the sensor means. Thus, the data required by the driver can be more easily inputted into the on-vehicle data processor.

The sensor means and data transmitter may be located within an information center. The data transmission between the information center and the data processor is made through a mobile telephone system.

DETAILED DESCRIPTION OF THE PREFERRED EMBODIMENTS

Figure 1:
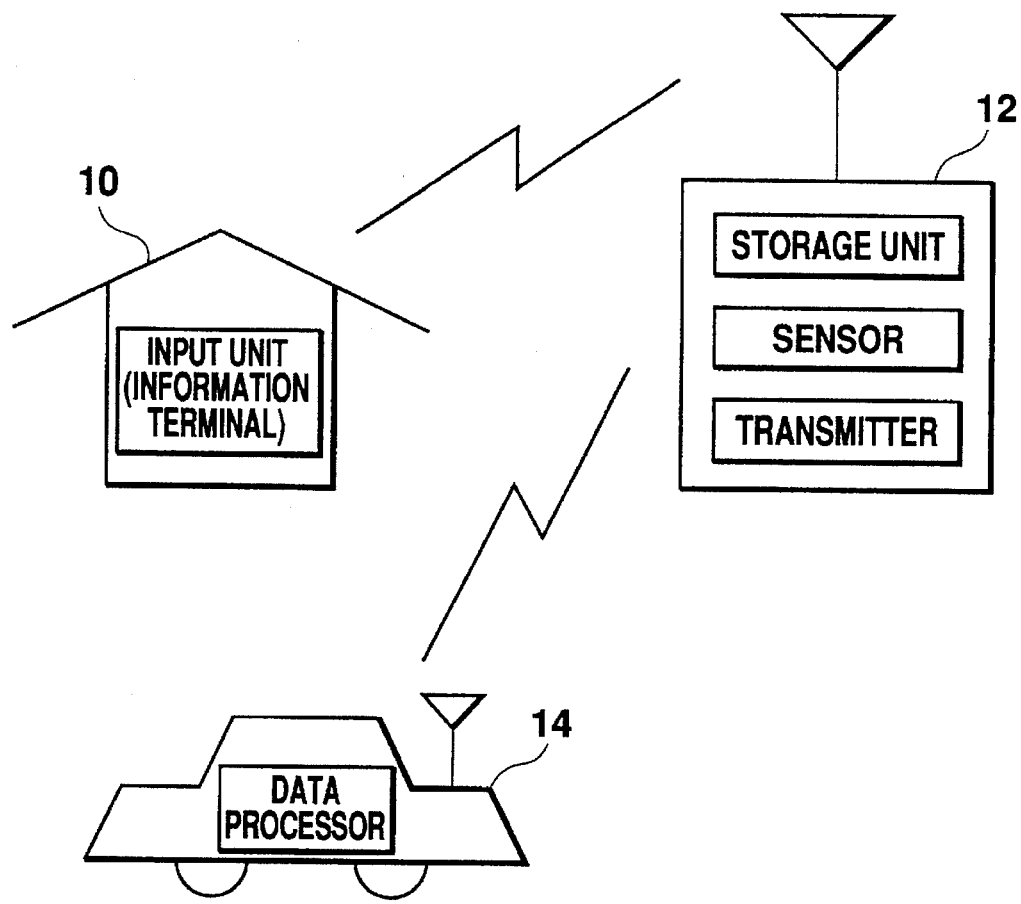
FIG. 1 is a layout of one embodiment of a vehicle data processing system constructed in accordance with the present invention.

Referring first to FIG. 1, there is shown a vehicle data processing system of the first embodiment constructed in accordance with the present invention with an operator's home 10, an information center 12 and a vehicle 14, between which the data transmission will be carried out. The vehicle 14 includes a navigation or audio system which may be used as a data processor while the operator's home 10 includes an input unit. The input unit comprises a transmitter for transmitting data inputted thereinto to the information center 12. The data processor comprises a receiver for receiving the data from the information center 12 and a transmitter for transmitting the start of the vehicle engine or the opening of a driver side door to the information center 12. If the data processor mounted in the vehicle 14 is a navigation system, the input unit may usually be in the form of a portable input unit for inputting transit points and a destination. Since the input unit of the first embodiment is not necessarily portable, however, it may be replaced by any existing personal computer or the like.

On the other hand, the information center 12 comprises a storage unit for receiving and storing input data from the transmitter of the input unit in the operator's home 10 through an antenna, a sensor unit for sensing a start signal from the transmitter of the in-vehicle data processor and a transmitter for transmitting the input data stored in the storage unit to the vehicle 14 when that transmitter receives the start signal. The information center 12 polls the vehicle 14 existing within its control area and transmits the data to the vehicle if it is in its started state.

The data processing in the first embodiment will be described in connection with the flowcharts of FIGS. 2, 3 and 4.

Figure 2:
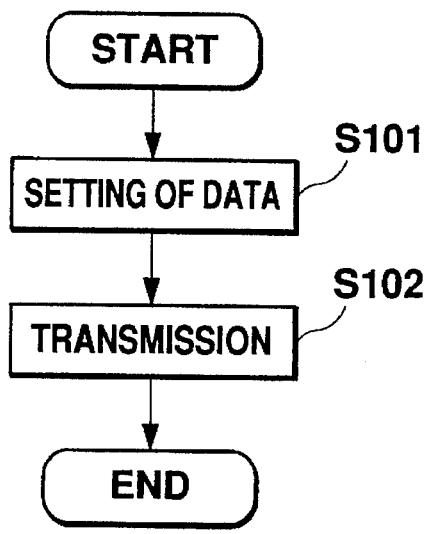
FIG. 2 is a flowchart illustrating the procedure of the first-mentioned embodiment which is carried out by an operator at his or her home.

FIG. 2 is a flowchart illustrating a procedure which is carried out by the input unit in the operator's home 10. If the data processor is a navigation system, the operator inputs transit points and a destination through the input unit to set data (S101). When the setting of data is completed, the input unit transmits the data to the information center 12 through a communication line such as telephone line (S102). From the viewpoint of cost, it is preferred that the data transmission is performed through a high-speed communication line or an "agent" communication.

Figure 3:
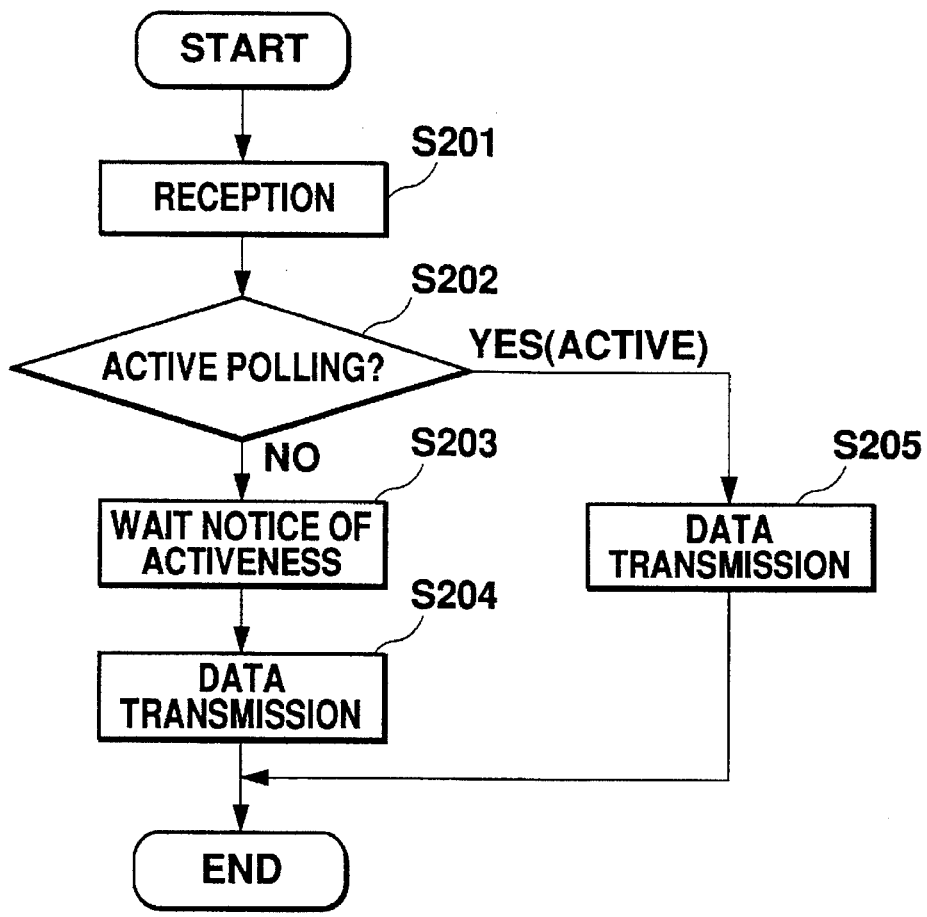
FIG. 3 is a flowchart illustrating a procedure of the first-mentioned embodiment which is carried out in an information center.

FIG. 3 is a flowchart illustrating a procedure in the information center 12. The information center 12 receives the input data from the input unit (S201), which input data are in turn stored in the storage unit. On the other hand, the sensor unit polls the vehicle 14 within its control area and judges which vehicle 14 has an active or started data processor (S202). If no start signal is transmitted from the data processor of the vehicle 14, the sensor unit judges that that vehicle is not active and will await the notice of becoming active (S203). If the operator starts the engine of the vehicle 14 (or turns the data processor on or opens the driver side door) to energize the data processor under the above condition, the sensor unit senses the start signal and then causes the storage unit to transmit the input data stored therein to the vehicle 14 (S204). On the other hand, if the sensor unit polls the vehicle and knows that the data processor of that vehicle 14 has already been active, the sensor unit immediately causes the storage unit to input the data stored therein to the vehicle 14 (S205).

Figure 4:
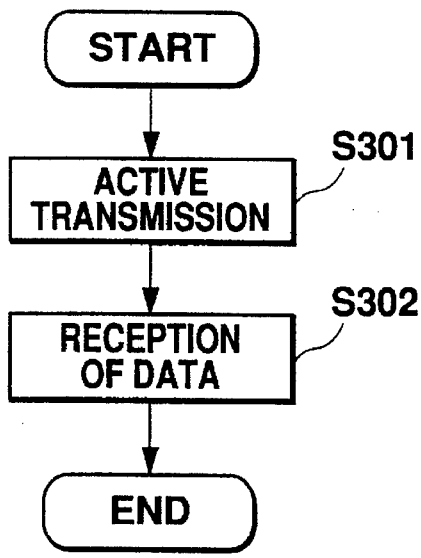
FIG. 4 is a flowchart illustrating a procedure of the first embodiment which is performed in the vehicle (or on-vehicle data processor).
Figure 5:
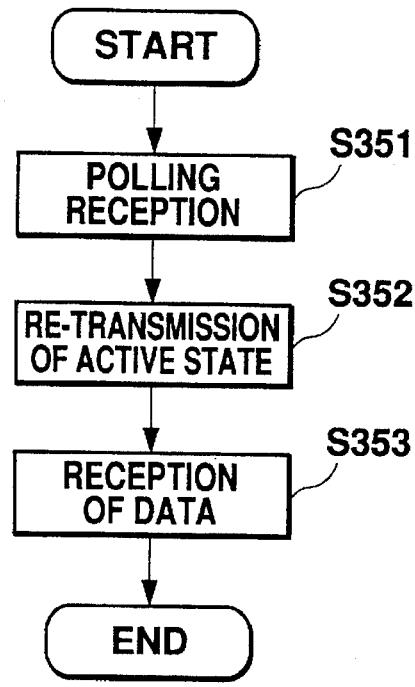
FIG. 5 is a flowchart illustrating the other procedure of the first embodiment which is carried out in the vehicle.

FIGS. 4 and 5 are flowcharts illustrating procedures in the data processor of the vehicle 14: FIG. 4 is a flowchart for when the engine is started (or the data processor is turned on or the driver side door is opened) while FIG. 5 is a flowchart illustrating when the data processor has already been active. If the engine is started to energize the data processor as in FIG. 4, the data processor transmits a start signal (notice of becoming active) from its transmitter to the information center 12 through a communication line such as mobile telephone system (S301). As the information center 12 receives the start signal, the data processor receives the input data transmitted to the information center 12 (S302). The data processor is responsive to the data for performing a desired procedure. If the data processor is a navigation system, it searches the optimum route based on the data of transit points and destination, the optimum route being then reported to the operator. On the other hand, if the data processor receives a polling from the information center 12 (S351) as shown in FIG. 5, the data processor transmits the start signal to the information center 12 for reporting the activity of the data processor to the information center 12 (S352). The information center 12 then transmits the input data to the data processor which receives the transmitted input data (S353) and performs a desired procedure.

In the first embodiment, thus, the data set at the operator's home 10 are collectively controlled by the information center 12 and inputted into the data processor when the data processor mounted on the vehicle 14 is started. Therefore, the desired data can be set by the operator at his or her home independently of the start/non-start of the data processor and without carrying the input unit to the vehicle 14.

Although the first embodiment has been described in connection with the navigation system usable as a data processor, any other data processor may be similarly used in the present invention. In addition to the input data of transit points and destination, map data, sightseeing information and others may be optionally inputted into the navigation system.

Although the data processor on the vehicle 14 basically receives only the input data from the information center 12 in the first embodiment, the present invention can provide another or second embodiment in which a data processor can request the information center 12 to transmit the necessary information from the information center 12 to the data processor. In such a case, the information center 12 is not required to sense the start of the data processor since the latter has already been started. However, the position of the moving vehicle 14 must be sensed.

Figure 6:
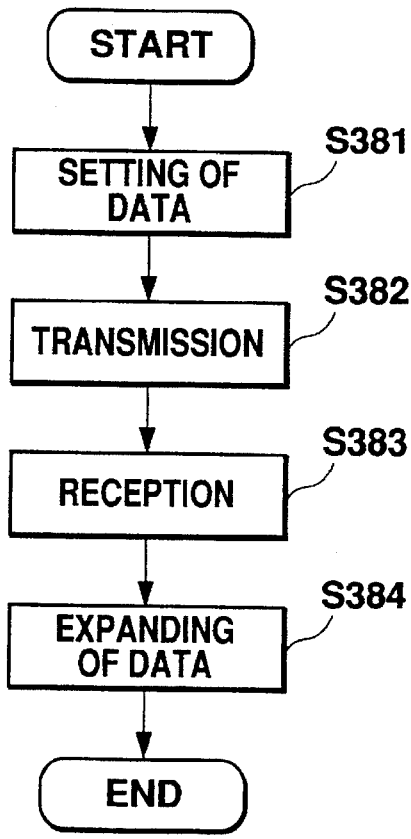
FIG. 6 is a flowchart illustrating a procedure of another embodiment of a vehicle data processing system constructed in accordance with the present invention which is performed in the vehicle.
Figure 7:
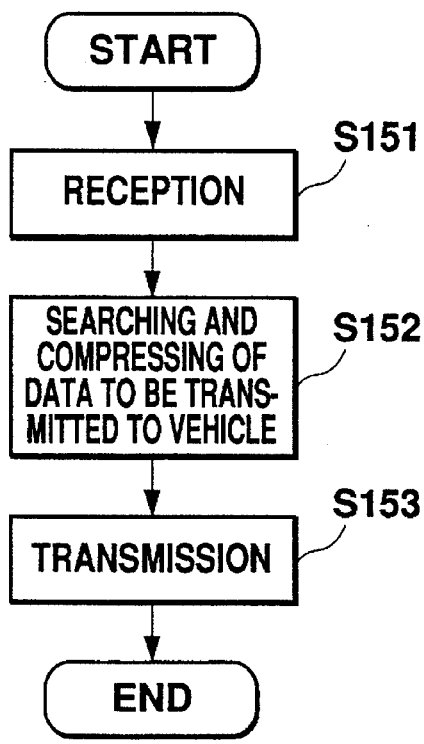
FIG. 7 is a flowchart illustrating a procedure of the second-mentioned embodiment which is carried out by the operator at his or her home.
Figure 8:
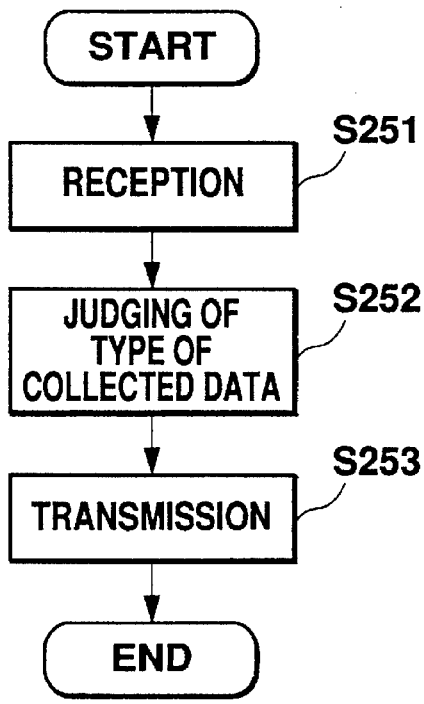
FIG. 8 is a flowchart illustrating a procedure of the second embodiment which is performed in the information center.

FIGS. 6 to 8 show flowcharts illustrating data processing procedures at the vehicle 14, information center 12 and operator's home 10 in the second embodiment.

FIG. 6 is a flowchart illustrating the data processing procedure in the vehicle 14. As the operator (driver) inputs the necessary data into the data processor (S381), the transmitter thereof transmits the data to the information center 12 through the communication line such as mobile telephone line (S382). When the information center 12 receives the transmitted data, it accesses the operator's home 10 to acquire the necessary information, as will be described. The data are then compressed and transmitted to the vehicle 14. The data processor receives the data from the information center 12 (S383) and expands the compressed data to perform its inherent process (S384). The necessary data may be music sources in the driver's home if the data processor is an audio system.

FIG. 7 is a flowchart illustrating a procedure in an information terminal at the operator's home. If the input unit is in the form of a personal computer, the input unit can be used directly as an information terminal. As the information terminal receives data required by the vehicle 14 and transmitted from the information center 12 (S151), the information terminal searches data to be transmitted to the vehicle 14 from various data previously stored in the storage device, such as music sources or the like. If the necessary data is found, the information terminal suitably compresses them (S152) and transmits the compressed data to the information center 12 through the communication line (S153).

Figure 9:
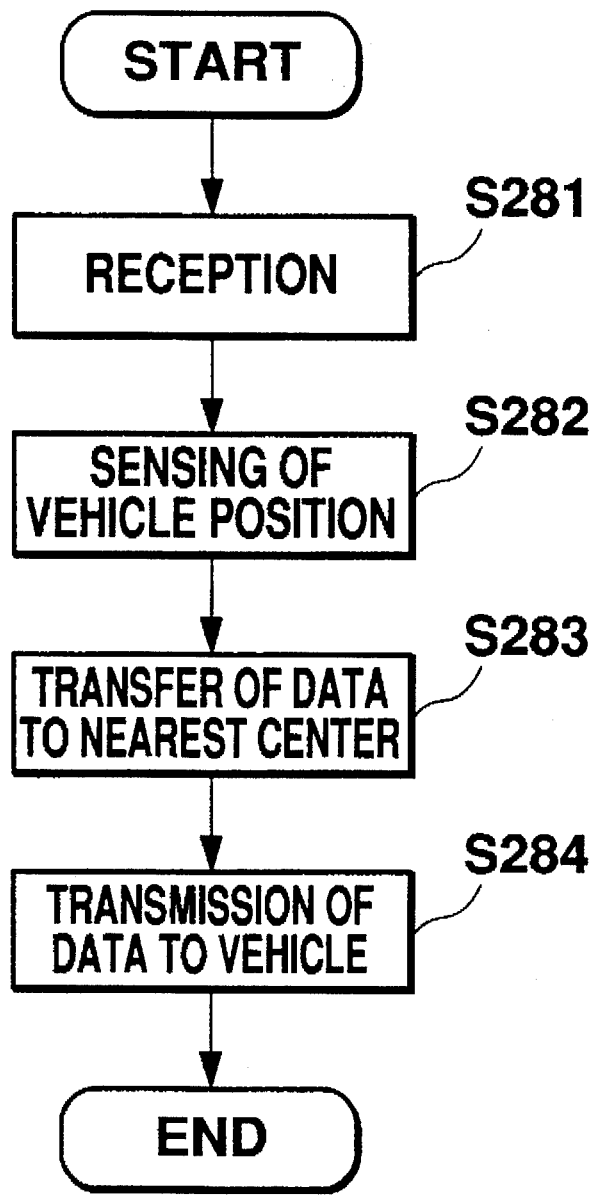
FIG. 9 is a flowchart illustrating the other procedure of the second embodiment which is carried out in the information center.

FIGS. 8 and 9 are flowcharts illustrating data processing procedures in the information center 12. As data are transmitted from the data processor on the vehicle 14 in FIG. 8, the information center 12 receives and analyzes the data (S251). The data analysis may be performed to judge the type of data, for example. After the data analysis, a data request signal is transmitted to the operator's home 10 through the communication line to request the necessary data (S253). As the information terminal in the operator's home 10 receives the request signal, it suitably compresses the necessary data and transmits the compressed data to the information center 12, as described.

As the information center 12 receives data transmitted from the information terminal in the operator's home 10 (S281) as in FIG. 9, the sensor unit in the information center 12 senses the position of the vehicle 14 requesting the data (S282). Such a detection of position may be made by polling the vehicle through a plurality of information terminals, relating to the respective control areas. As the position of the vehicle 14 is sensed, the data transmitted from the operator's home 10 are transferred to an information center 12 nearest that vehicle 14 (S283). The data are further transmitted from the information center 12 to the data processor on the vehicle 14 through the mobile telephone line or the like (S284).

In such a manner, the driver can enjoy any music stored in the driver's home 10 merely by inputting the data relating to such music into the data processor while driving the vehicle 14.

Although the second embodiment has been described as to the request of data from the data processor on the vehicle 14 to the operator's home 10, more types of information can be acquired if the information center 12 is connected to any other source of information (e.g., rental shop) through the communication line.

The system of the second embodiment may be similarly applied to business vehicles. In such a case, any necessary information may be transmitted from an office to the information center 12 such that the office can directly receive a schedule of car allocation or the like from the information center 12.

As described, the vehicle data processing system of the present invention can input data into the input unit even if the on-vehicle data processor is not active and can also acquire the necessary data from any one of the operator's home and other information sources, the data being then processed by the data processor in any suitable manner.

We claim:

1. A vehicle data processing system comprising:
   an on-vehicle data processor having a data receiving portion for receiving data to be processed;
   an off-vehicle input unit separated independently from the data processor;
   a data storage unit for storing data inputted into the data input unit;
   a sensor unit for sensing the starting of the data processor; and
   a data transmitter for transmitting the data stored in the data storage unit to the data processor when the starting of the data processor is sensed by the sensor unit, wherein said data storage unit, sensor unit and data transmitter are disposed within an information center, said data processor includes a transmitter for transmitting a start signal to the information center when said data processor is started, and said dam processor transmits the start signal to the information center when the engine of the vehicle is started or when the driver side door of the vehicle is opened.

2. A vehicle data processing system as defined in claim 1 wherein the data communication between said information center and said data processor is made through a mobile telephone system.

3. A vehicle data processing system as defined in claim 1 wherein the sensor unit in said information center polls a plurality of vehicles moving within its control area to sense a vehicle transmitting the start signal.

4. A vehicle data processing system as defined in claim 1 wherein said data processor is a navigation system and wherein said data input unit is used to input navigation information.

5. A vehicle data processing system as defined in claim 1 wherein said data processor is an audio system and wherein said input unit is used to input music information.

6. A vehicle data processing system as defined in claim 1 wherein said data processor is an audio system and wherein said data processor transmits a request signal, said request signal being music information.

* * * * *

UNITED STATES PATENT AND TRADEMARK OFFICE
CERTIFICATE OF CORRECTION

PATENT NO. : 5,648,769
DATED : 15 July 1997
INVENTOR(S) : Koji SATO et al.

It is certified that error appears in the above-identified patent and that said Letters Patent is hereby corrected as shown below:

| Column | Line | |
|---|---|---|
| 3 | 49 | Change "Judges" to --judges--. |
| 6 | 24 | Change "dam" to --data--. |

Signed and Sealed this

Tenth Day of February, 1998

Attest:

BRUCE LEHMAN

Attesting Officer     *Commissioner of Patents and Trademarks*